(12) United States Patent
Moriyasu et al.

(10) Patent No.: US 7,108,406 B2
(45) Date of Patent: Sep. 19, 2006

(54) TERMINAL RETAINER AND STROBE DEVICE USING THE RETAINER

(75) Inventors: Takashi Moriyasu, Higashiosaka (JP); Akihiro Suzuki, Nishinomiya (JP); Takashi Saijo, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 40 days.

(21) Appl. No.: 10/914,076

(22) Filed: Aug. 10, 2004

(65) Prior Publication Data

US 2005/0037675 A1    Feb. 17, 2005

(30) Foreign Application Priority Data

Aug. 12, 2003  (JP)  .............................. 2003-207230

(51) Int. Cl.
*F21V 21/00*     (2006.01)

(52) U.S. Cl. ....................... 362/427; 362/640; 362/457

(58) Field of Classification Search ................ 362/427, 362/3, 217, 640, 370, 362, 457; 396/544, 396/661; 439/733.1; 206/726, 316.1, 728
See application file for complete search history.

(56) References Cited

U.S. PATENT DOCUMENTS 6,445,885 B1 * 9/2002 Nakanishi et al. .......... 396/176

FOREIGN PATENT DOCUMENTS

JP          9-113969          5/1997

* cited by examiner

*Primary Examiner*—Sharon E. Payne
(74) *Attorney, Agent, or Firm*—Armstrong, Kratz, Quintos, Hanson & Brooks, LLP

(57) ABSTRACT

A retainer includes: a connecting piece; one or more retaining parts provided at either end of the connecting piece and having a hole into which a terminal of an electrical component fits; an arm piece extending from near the hole; and a washer that is formed on the fore-end of the arm piece and is for fitting together with the hole over the terminal, wherein the connecting piece, the retaining part, the arm piece, and the washer are formed integrally of an insulating material having good expansion/contraction properties.

3 Claims, 4 Drawing Sheets

TERMINAL RETAINER AND STROBE DEVICE USING THE RETAINER

BACKGROUND OF THE INVENTION

1. Field of the Invention

The present invention relates to retainers for retraining terminals on a high-pressure part of a lamp, and strobe devices using the retainers.

2. Description of Related Art

FIG. 7 is an oblique view of a strobe device 1 suitable for installation in cameras, and FIG. 6 is an exploded oblique view thereof. The strobe device 1 includes a case 2 made of a resin, a reflector 3 made of a metal, and a rod-shaped lamp 4. The case 2 has a front opening 21. The reflector 3 has a front opening 31 and fits into the case 2 through the opening 21 of the case 2. The lamp 4 is arranged inside the reflector 3. The lamp 4 has terminals 41 and 41a on opposite ends thereof, which project outwardly through holes 23, 33 and 33, 23, formed at opposite ends of the case 2 and the reflector 3.

The lamp 4 is fixed to the case 2 with a band-shaped retainer 5 that has good expansion/contraction properties and insulation performance. (See, for example, Japanese Unexamined Pat. App. Pub. No. 9-113969).

The retainer 5 has holes 53 and 53a, which are formed at opposite ends of an elongated connecting piece 51 and into which terminals 41 and 41a are fitted tightly. In order to fix the lamp 4 to the case 2 with the retainer 5, one hole 53 is fitted onto the terminal 41 on one end of the lamp 4, the connecting piece 51 is stretched along the outer rear face of the case 2, and the other hole 53a is fitted onto the terminal 41a on the other end of the lamp 4. The pulling force of the retainer 5 tending to return to its original shape presses the lamp 4 against the rear of the case 2, thus fastening the lamp 4 to the case 2. (See FIG. 7.) As shown in FIG. 8, conductor wires 6 are soldered onto the terminals 41 and 41a.

The holes 53 and 53a of the retainer 5 are fitted tightly onto the terminals 41 and 41a. The fore-end of the retainer 5 electrically insulate the solder 7 from the reflector 3, thus preventing electric leakage.

As shown in FIG. 8, however, a pulling force acts on both ends of the retainer 5 in a state in which the lamp 4 is fitted. As a result, the hole 53 of the retainer 5 is elongated in the stretching direction, producing a gap 50 between the hole 53 and the terminal 41 of the lamp 4.

Due to the just-noted gap 50, the retainer often loses the effects of electrical insulation and electric leakage prevention, leading to such problems as giving electrical shocks to users and causing flashing failures.

It is an object of the present invention to provide a terminal retainer free from such problems as giving electrical shocks to users and flashing failures.

BRIEF SUMMARY OF THE INVENTION

A retainer 5 includes: a connecting piece 51; one or more retaining parts 52 provided on either end of the connecting piece 51 and having a hole 53 into which a terminal 41 of an electrical component fits; an arm piece 54 extending from near the hole 53; and an washer 55 formed on a fore-end of the arm piece 54 and for fitting together with the hole 53 over the terminal 41. All of the connecting piece 51, the retaining part 52, the arm piece 54, and the washer 55 are integrally formed of an insulating material having good expansion/contraction properties.

By folding backward the arm piece 54 of the retainer 5 and fitting the washer 55 over the terminal 41 of the electrical component, the washer 55 can serve the role of electrical insulation and electric leakage prevention.

Even when the connecting piece 51 is stretched, the force from the connecting piece 51 does not directly act on the arm piece 54 provided with the washer 55, and therefore, no pulling force acts on the washer 55. Consequently, deformation of the hole 58 of the washer 55 is prevented.

Thus, the retaining force between the connecting piece 51 and the terminal 41 of the electric component does not cause adverse effects, and it is possible to prevent loss of electrical insulation performance and electric leakage prevention effect.

Since the washer 55 is formed integrally with the retainer 5, loss of the washer 55 or dropping of the washer 55 is not likely to happen when fitting the washer 55 onto the terminal 41. Thereby, assembling workability is also improved. Because the washer 55 can be formed integrally with the connecting piece 51, manufacturing cost can be reduced in comparison with the case in which the washer is independently produced.

DETAILED DESCRIPTION OF THE PREFERRED EMBODIMENTS

First Embodiment

Figure 1:
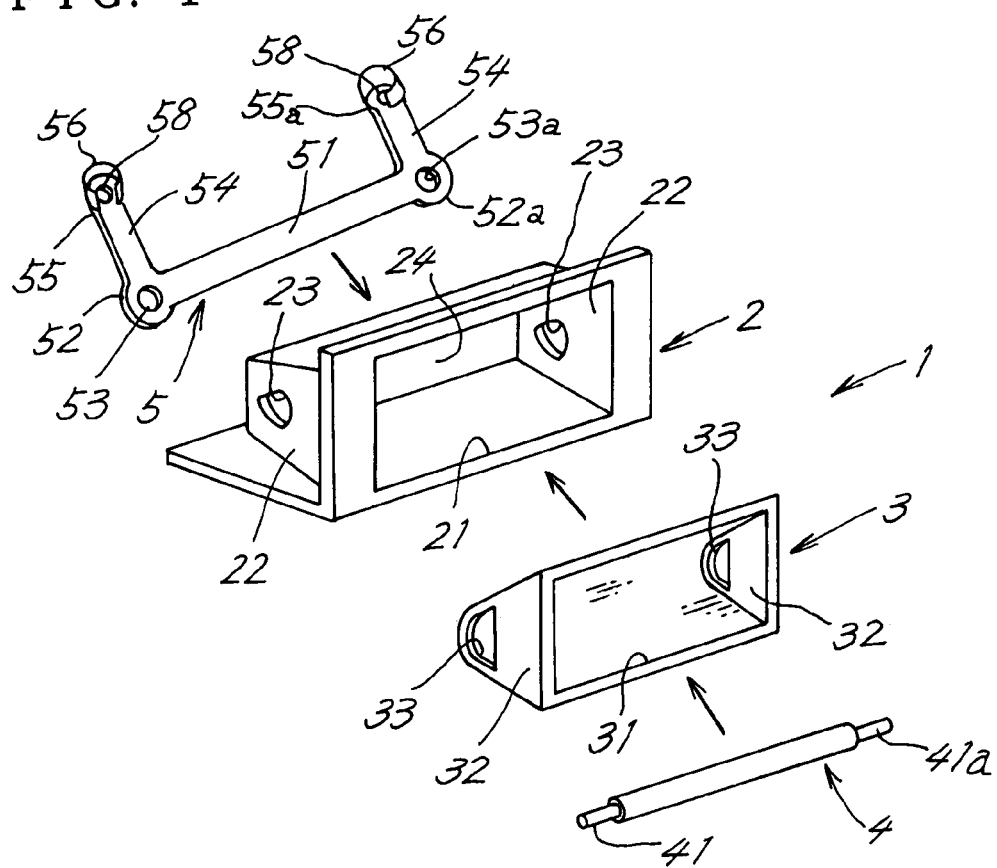
FIG. 1 is an exploded oblique view of a strobe device.

FIG. 1 is an exploded view of a strobe device 1 for digital cameras.

The strobe device 1 comprises a horizontally oblong case 2 made of a synthetic resin, a horizontally oblong reflector 3 made of a metal, a rod-shaped lamp 4 arranged inside the reflector 3, and a retainer 5 for fixing the lamp 4 to the case 2. The case 2 is held inside a camera body (not shown). The reflector 3 is accommodated into the case 2 through a front opening 21 of the case 2. The lamp 4 of the present embodiment is a xenon tube.

Side walls 22, 22 of the case 2 have holes 23, 23 formed near the rear, and side plates 32, 32 of the reflector 3 also have holes 33, 33 formed near the rear.

Terminals 41 and 41a on opposite ends of the lamp 4 project outward of the case 2 through the holes 23, 33 and 33, 23, respectively, with a slight clearance therebetween.

The retainer 5 is formed of a material that has excellent insulation performance and good expansion/contraction properties and does not dissolve even when in contact with melted solder, such as silicone rubber.

Figure 2:
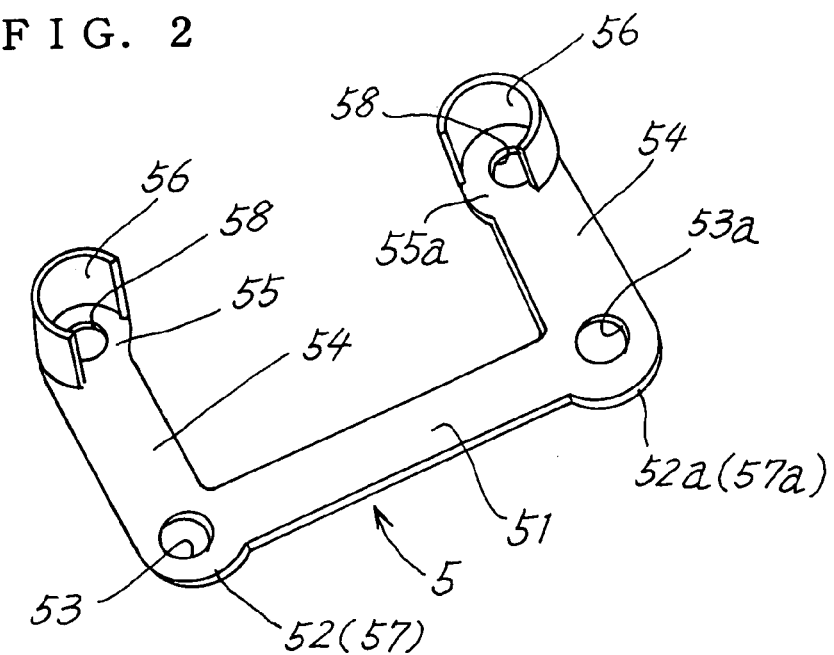
FIG. 2 is an oblique view of a retainer.

As illustrated in FIG. 2, the retainer 5 is provided with retaining parts 52 and 52a on opposite ends of a band-shaped connecting piece 51, and arm pieces 54, 54 projecting from the retaining parts 52 and 52*a* so as to be substantially perpendicular to the connecting piece 51. The fore-ends of the arm pieces 54, 54 are furnished with washers 55 and 55*a*.

Holes 53 and 53*a* into which the terminals 41, 41*a* of the lamp 4 fit tightly are formed at the center portion of the retaining parts 52 and 52*a*. The terminals 41 and 41*a* also fit tightly into holes 58, 58 formed at the center of the washers 55 and 55*a*.

The distance between the holes 53 and 53*a* of the retaining parts 52, 52 is shorter than the distance between the terminals 41 and 41*a* of the lamp 4. To attach the retainer 5 onto the lamp 4, the retainer 5 is stretched as will be described later so that connecting piece 51 is put on the outer rear face of the case 2, and the terminals 41 and 41*a* of the lamp 4 are fitted into the holes 53 and 53*a*.

An arc-shaped wall 56 is formed protruding from the outer periphery of each of the washers 55 and 55*a* of the retainer 5. The terminals 41 and 41*a* of the lamp 4 are insulated from other components in the vicinity of the terminals 41 and 41*a* by the arc-shaped walls 56 in a state in which the strobe device 1 is mounted to a camera.

Installation of Retainer

First, the reflector 3 is inserted through the opening 21 of the case 2 so that the rear face of the reflector 3 is put against the rear wall 24 of the case 2.

The lamp 4 is inserted into the case 2 and the reflector 3. The terminals 41 and 41*a* on the opposite ends of the lamp 4 are stuck outward of the case 2 through the holes 23, 33 and 33, 23 in the opposite end portions of the case 2 and the reflector 3.

Next, the connecting piece 51 of the retainer 5 is stretched so as to put against the outer rear face of the case 2. The terminal 41 on one end of the lamp 4 is fitted into the hole 53 of the retaining part 52 on one end, and the terminal 41*a* on the other end of the lamp 4 is fitted into the hole is fitted to the hole 53*a* of the retaining part 52*a* on the other end. The lamp 4 is pressed toward the rear wall 24 of the case 2 by the pulling force of the connecting piece 51 tending to return to its original shape. Thus, the lamp 4 and the reflector 3 can be retained.

The retaining part 52*a* serves as a mount part 57*a* for mounting the retainer 5 onto the case 2 with respect the retaining part 52 of the retainer 5 that has been fitted onto the one terminal 41. Likewise, the retaining part 52 also serves as a mount part 57 for mounting the retainer 5 onto the case 2 with respect to the retaining part 52*a* of the retainer 5 that has been fitted onto the other terminal 41*a*.

That is, both retaining parts 52 and 52*a* also serve as the mount parts 57 and 57*a* for mounting the lamp 4 to the case 2.

Figure 3:
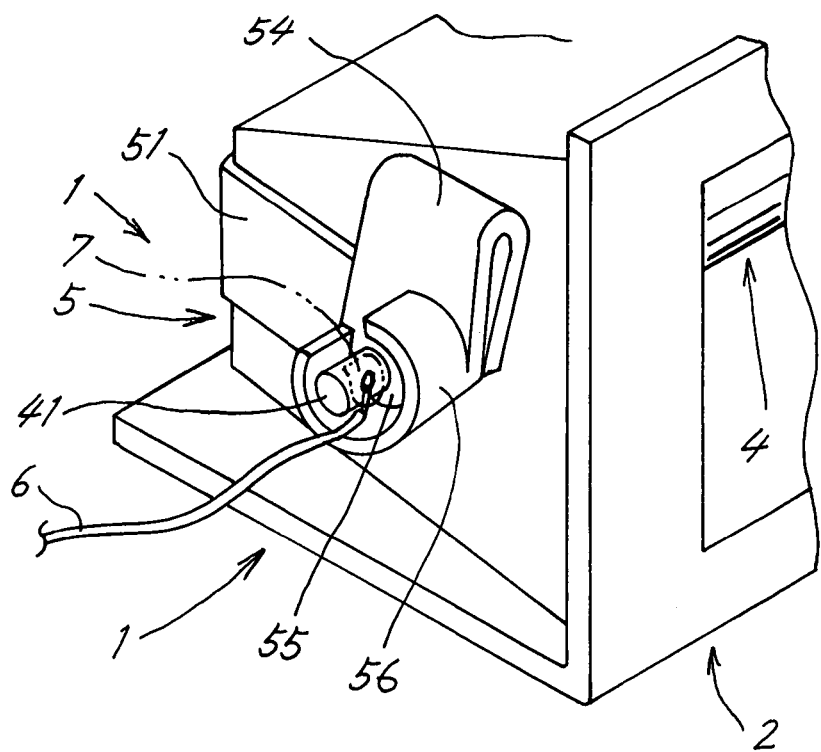
FIG. 3 is an oblique view illustrating a primary portion of the strobe device showing how a lamp is fitted thereto.

As illustrated in FIG. 3, the arm pieces 54, 54 are folded backward from near the opposite ends of the retainer 5 so that the terminals 41 and 41*a* of the lamp 4 are fitted tightly into the holes 58, 58 of the washers 55 and 55*a*.

Conductor wires 6 are attached onto each of the terminals 41 and 41*a* by solder 7 within each of the arc-shaped walls 56 on the washers 55 and 55*a*.

Since the washers 55 and 55*a* are not located on the connecting piece 51, the washers 55 and 55*a* do not receive a pulling force even when the connecting piece 51 is stretched. For this reason, the holes 58, 58 of the washers 55 and 55*a* do not deform in such a manner that gaps are between the washers and the terminals 41 and 41*a*. Thus, the washers 55 reliably serves the role of electrical insulation and electric leakage prevention.

Since the washers 55 and 55*a* are formed integrally with the retainer 5, loss of the washers 55 and 55*a* or dropping of the washers 55 and 55*a* is not likely to happen when fitting the washers 55 and 55*a* onto the terminals 41 and 41*a*. As a consequence, assembling workability is improved.

Due to the fact that the washer 55 can be formed integrally with other parts by die forming, manufacturing cost can be reduced in comparison with the case in which the washers are independently produced.

It should be noted that in the just-described embodiment, the arm pieces 54, 54 of the retainer 5 extend from the retaining parts 52 and 52*a* so as to be perpendicular to the connecting piece 51. The purpose is to prevent the arm pieces 54 that have been folded backward from making contact with the case 2 or other components near the strobe device 1.

The orientation of the arm pieces 54, 54 with respect to the connecting piece 51 is not limited as long as they do not interfere with the case 2 or other components.

It is desirable that the length of each arm piece 54 be as short as possible as long as it is possible to fold the arm piece 54 backward so that the washers 55 and 55*a* can be fitted onto the terminals 41 and 41*a*.

Second Embodiment

Figure 4:
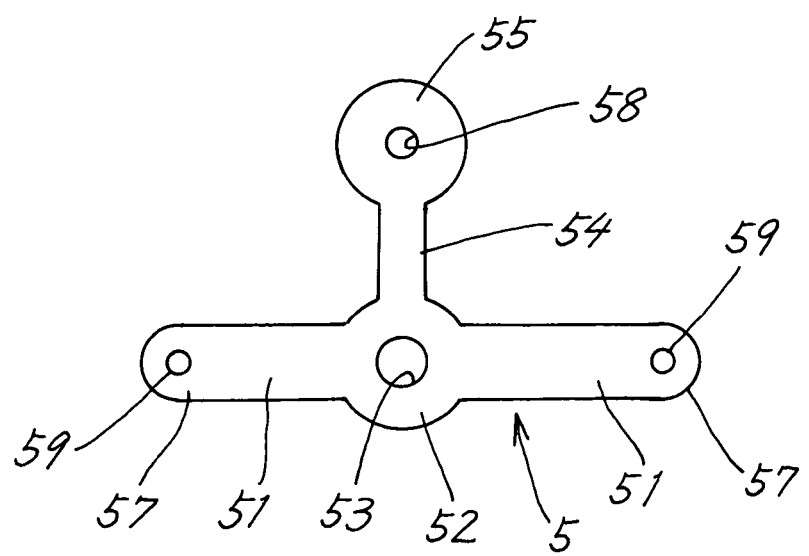
FIG. 4 is a front view of a retainer according to another embodiment.
Figure 5:
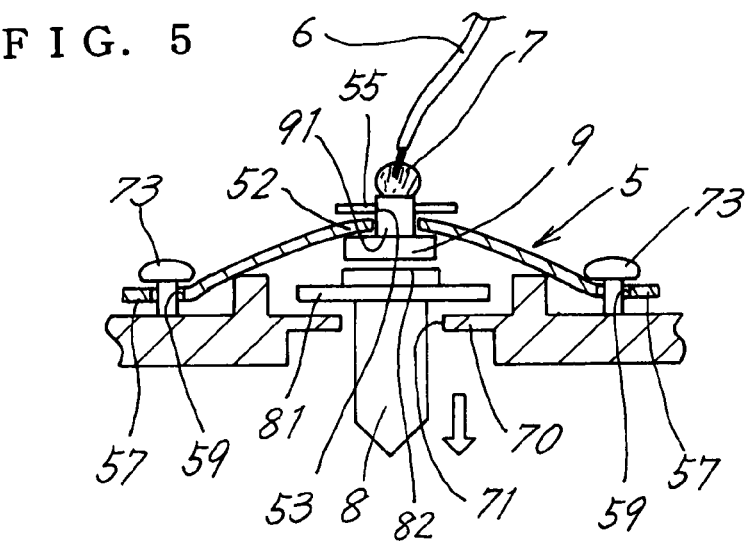
FIG. 5 is a cross-sectional view showing how a lamp is fitted using the retainer of FIG. 4.
Figure 6:
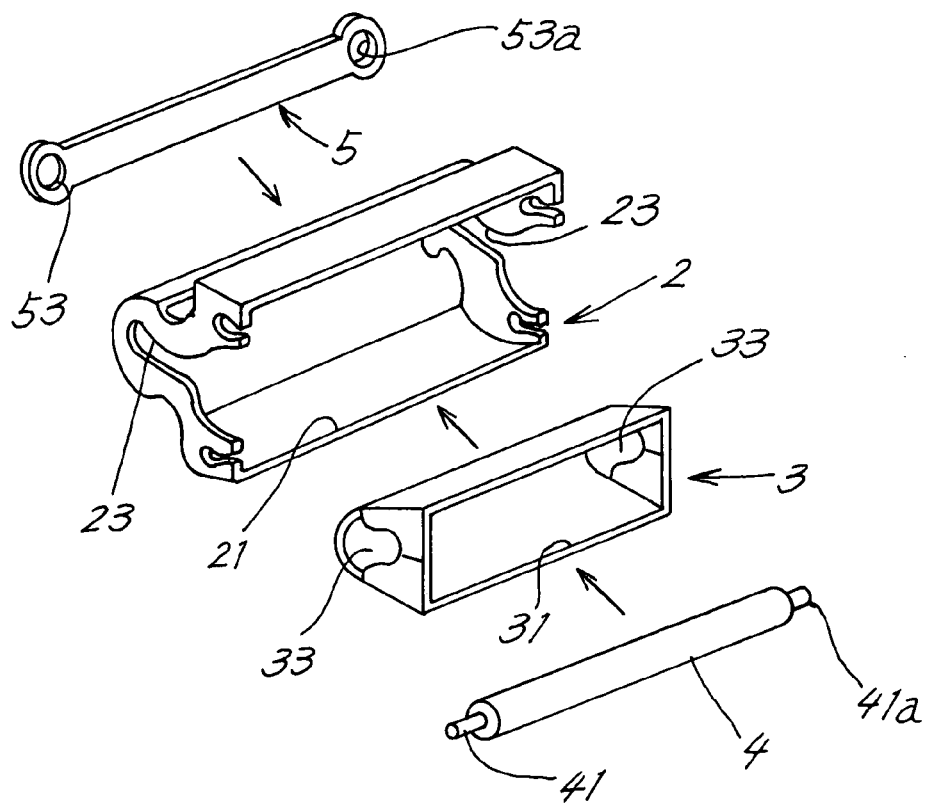
FIG. 6 is an exploded oblique view of a conventional strobe device.
Figure 7:
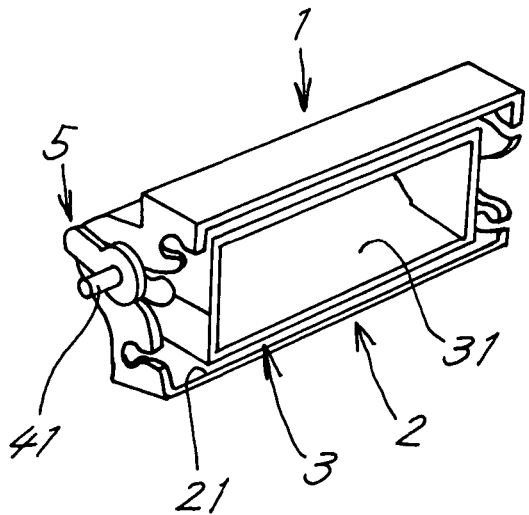
FIG. 7 is an oblique view of the conventional strobe device.
Figure 8:
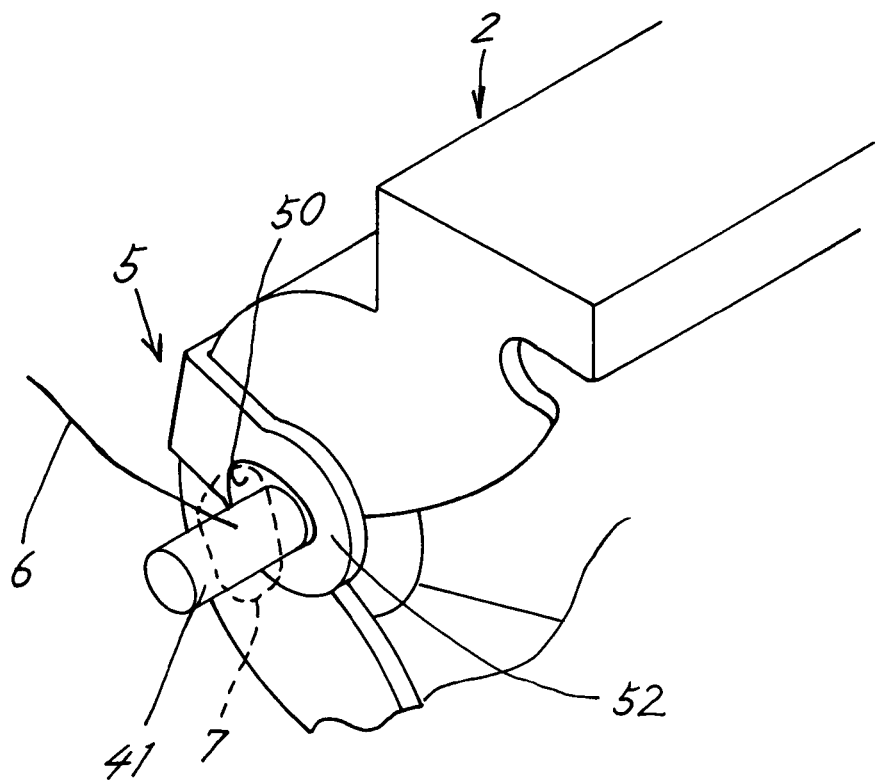
FIG. 8 is an oblique view showing how a conventional lamp is fitted with the conventional example.

FIG. 4 illustrates a retainer 5 according to another embodiment, and FIG. 5 illustrates how the retainer 5 is used for an automobile headlight mount part.

The retainer 5 has a retaining part 52 at the center. From the retaining part 52, connecting pieces 51, 51 extend toward both right and left sides. The fore-ends of the connecting piece 51, 51 have mount parts 57, 57. Each of the mount parts 57 are formed so that it has a hole 59 formed at the fore-end of the connecting piece 51.

An arm piece 54 extends from the retaining part 52, and a washer 55 is formed on the fore-end of the arm piece 54.

As shown in FIG. 5, a lamp 8 is fitted into a hole 71 of a lamp mount seat 70 of the headlight, and a flange 81 of the lamp 8 is attached onto the mount seat 70. A terminal 91 of a plug 9, which is arranged rearward of the lamp 8 and is isolated from the lamp, is fitted into the hole 53 of the retaining part 52 of the retainer 5. The connecting pieces 51, 51 of the retainer 5 are stretched and hooks 73, 73 are fitted into the holes 59, 59 of both mount parts 57, 57.

By the pulling force of the connecting pieces 51, 51, the plug 9 is pressed against a terminal face 82 of the lamp 8.

The arm piece 54 of the retainer 5 is folded backward to fit the hole 58 of the washer 55 tightly onto the plug 9. A conductor wire 6 is connected to the plug 9 with solder 7.

The washer 55 serves the role of electrical insulation and electric leakage prevention, as in the foregoing embodiment.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A terminal retainer comprising:
a connecting piece;
one or more retaining parts provided on the connecting piece and having a hole into which a terminal of an electrical component fits;
an arm piece extending from near the hole; and
a washer formed on the fore-end of the arm piece, the washer being capable of being fitted over the hole and the terminal,
wherein the connecting piece, the retaining part, the arm piece, and the washer are integrally formed of an insulating material having flexible expansion and contraction properties.

2. The terminal retainer according to claim 1, comprising two retaining parts on complementary ends of the terminal retainer, wherein each one of the retaining parts also serves as a mount part for mounting the terminal retainer.

3. A strobe device comprising:
a case having a front opening;
a reflector accommodated in the case;
a rod-shaped lamp having on opposite ends terminals projecting outward of the case through end portions of the case; and
a retainer including a connecting piece having on opposite ends holes into which a terminal of the lamp fits so that the lamp is retained in the case by the pulling force of the retainer tending to return to its original shape,
wherein on opposite ends the retainer has arm pieces extending from near the holes and washers formed on the fore-ends of the arm pieces, with the arm pieces folded backward to fit the washers onto the terminals of the lamp.

* * * * *